United States Patent Office

2,946,811
PREPARATION OF Δ⁹⁽¹¹⁾-ANHYDRO STEROIDS

Earl M. Chamberlin, Westfield, and Torleif Utne, Warrenville, N.J., assignors to Merck & Co., Inc., Rahway, N.J., a corporation of New Jersey No Drawing. Filed Mar. 29, 1957, Ser. No. 649,301

10 Claims. (Cl. 260—397.45)

This invention relates to the preparation of steroids, and particularly, to the preparation of Δ⁹⁽¹¹⁾-anhydro steroids from 11β-hydroxy steroids.

This application is a continuation-in-part of our application Serial No. 489,768, filed in the United States Patent Office on February 21, 1955, now abandoned.

It has been suggested to prepare Δ⁹⁽¹¹⁾-anhydro steroids from 11β-hydroxy steroids by treating with phosphorous oxychloride in pyridine. It has also been suggested to carry out this reaction with a mixture of acetic acid and hydrochloric acid, as well as, with acetic acid alone in the presence of a catalyst, such as, hydrogen bromide. The effectiveness of those various methods depends to a large extent upon the particular 11β-hydroxy steroid employed. In using the phosphorous oxychloride method, an 11β-hydroxy-pregnane will be converted to the corresponding Δ⁹⁽¹¹⁾-anhydropregnene in relatively good yield, although it usually requires an extended period of time, at room temperature, to complete the reaction. When an 11β-hydroxy-Δ⁴-pregnene is converted to the corresponding Δ⁴,⁹⁽¹¹⁾-anhydro-pregnadiene, the yield, however, is relatively small. A relatively high yield of product may be obtained after extensive reaction time, when the starting material is a compound having keto groups blocked, such as, at the 3 and 20 positions by a ketal formation. An example of this is the conversion of Δ⁵-pregnene-11β,17α,21-triol-3,20-dione-21-acetate-3,20-bisethylene ketal to the corresponding Δ⁵,⁹⁽¹¹⁾-anhydro-pregnadiene. The use of a mixture of acetic acid and hydrochloric acid results in low yields of Δ⁹⁽¹¹⁾-anhydro steroid, although the reaction is relatively rapid. Acetic acid with a hydrogen bromide catalyst results in only fair yields and requires an extensive period of reaction time.

It has been suggested to subject 11α-hydroxy steroids, after first acylating any 21-hydroxy group, to tosylation to form the corresponding 11α-tosylate compound. The latter compound is then reacted with sodium acetate and boiling acetic acid to form the corresponding Δ⁹⁽¹¹⁾-anhydro steroid. This reaction differs from the reactions mentioned above, in that, it requires two distinct steps to remove the 11α-hydroxy group and form a double bond at position 9(11). This method has not been applied to 11β-hydroxy steroids, because when the hydroxy group is in the β configuration it is not subject to tosylation, except under such severe conditions as to cause the destruction of the molecule. This is especially the case with a steroid having a 17-position ketal side chain because of the recognized lability of such a side chain, and also with steroids having a double bond at the 4-position which would be expected to undergo reaction.

It is an object of this invention to provide a simplified procedure for converting 11β-hydroxy steroids to the corresponding Δ⁹⁽¹¹⁾-anhydro steroid. It is another object to provide such a process whereby the conversion is carried out directly in one step in high yield. It is a further object of the invention to provide such a process which can be applied to a broad group of steroids with uniformly good results. Other objects and the advantages of invention will appear hereinafter.

In accordance with the invention 11β-hydroxy steroids are converted to the corresponding Δ⁹⁽¹¹⁾-anhydro steroid by treating with an alkyl halosulfinate. The alkyl halosulfinate is of the formula

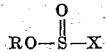

wherein R is an alkyl group preferably having a carbon chain length of from one to eight carbon atoms and X is a halogen group preferably a chloro or bromo group. Typical examples of such compounds which may be mentioned are methyl chlorosulfinate, ethyl chlorosulfinate, propyl chlorosulfinate, butyl chlorosulfinate, methyl bromosulfinate, ethyl bromosulfinate, propyl bromosulfinate, α-chloroethyl-chlorosulfinate and α-chloroethyl-bromosulfinate. The lower alkyl (from one to four carbon atom chain) halosulfinates are distinctly advantageous because the reaction may be carried out at more desirable reaction conditions since they have lower decomposition temperatures. The alkyl halosulfinate is usually used in an amount ranging from one to ten moles per mole of 11β-hydroxy steroid and preferably greater than two moles per mole of steroid.

In a preferred embodiment of the invention, the reaction is carried out with the alkyl halosulfinate in the presence of an acid-binding agent. Typical examples of classes of such agents are organic amines such as pyridines, N-alkylmorpholines, N-alkyl-piperidines, lutidines, collidines, trialkylamines, dialkylacylamides and inorganic bases. Of particular mention are the more readily available members of these groups, such as pyridine, N-methylmorpholine, N-ethylmorpholine, α,γ-lutidine, collidines, trimethylamine, triethylamine, tripropylamine dimethylaniline, diethylaniline, N-amylpiperidine, N-butylpiperidine, N-ethylpiperidine, N-methylpiperidine, N-heptylpiperidine, dimethylformamide, diethylformamide, dimethylacetamide, N-propylpiperidine, sodium carbonate, sodium bicarbonate and other alkali-metal carbonates and bicarbonates. The agent is preferably present in from one to ten moles for each mole of steroid. The agent selected is preferably one that is also a solvent for the 11β-hydroxy steroid, such as pyridine, lutidine, dimethylformamide or dimethylacetamide.

The reaction is conveniently carried out in a solvent for the steroid. The solvent, as mentioned above, may also serve as the acid-binding agent. The solvent may also be a mixture of a hydrocarbon and an acid-binding agent, such as benzene-pyridine mixture or a mixture of a chlorinated hydrocarbon and an acid-binding agent, such as methylene chloride and pyridine. Other solvents which may be mentioned are tetrahydrofuran, chloroform, acetone, propylene glycol, methyl ethyl ketone and anhydrous mixtures of these solvents.

The time required for the reaction will depend, in part, upon the particular reactants, solvents, and temperatures. At room temperature of 25–30° C., the reaction usually requires approximately one-half to three hours when a lower alkyl halosulfinate is used. At temperatures of from −15° C. to 0° C., the time may be increased to four to ten hours. The reaction is preferably carried out at a temperature of 0° C. or below because in this range maximum yield is obtained.

Any of the 11β-hydroxy steroids having a hydrogen atom attached to the 9-position may be converted to the corresponding Δ⁹⁽¹¹⁾-anhydro steroids by this process. The method is well suited to dehydration of 11β-hydroxy pregnanes and unsaturated pregnanes. The presence of other substituents in the molecule, such as keto groups at the 3 or 20 positions or hydroxy groups at the 3, 17α or 21 positions, or the presence of double bonds, as in the 1:2, 4:5, 5:6 or 16:17 positions, does not interfere with the reaction. It is desirable, however, to esterify a hydroxy group, if present, at the 21-position.

The reaction is of particular value for dehydration of 11β-hydroxy pregnanes having a double bond attached to the C–5 position, since heretofore a method for converting such compounds to the corresponding $\Delta^{9(11)}$-anhydro compounds in high yield and in a relatively short reaction time was not available.

Such unsaturated pregnanes ordinarily are oxygenated at the 3 and 20 positions, and may also have hydroxy groups at the 17 and 21 positions as well as at the 11β-position. In addition to a double bond attached to the C–5 position, i.e. a 4:5 or 5:6 double bond, they may also be unsaturated in the 1:2 position and elsewhere in the molecule.

Particular examples of 11β-hydroxy steroids suitable for our process are the 21-esters of $\Delta^4$-pregnene-11β,17α,21-triol-3,20-dione, such as the acetate, propionate, formate, butyrate, benzoate, t-butylacetate, hemisuccinate and phenyl acetate esters; and $\Delta^4$-pregnene-11β,17α-diol-3,20-dione; $\Delta^4$-pregnene-11β-ol-3,20-dione; $\Delta^4$-pregnene-11β,21-diol-3,20-dione 21-acetate; acetate esters of $\Delta^4$-pregnene-11β,17α,20,21-tetrol-3-one; $\Delta^4$-androstene-11β-ol-3,17-dione; pregnane-11β-ol-3,20-dione; pregnane-11β,21-diol-3,20-dione 21-acetate; pregnane-11β,17α,21-triol-3,20-dione 21-propionate; allopregnane-11β,17α,21-triol-3,20-dione 21 - butyl acetate; $\Delta^5$-pregnene-3β,11β-diol-20-one; $\Delta^5$-pregnene - 11β,17α,21 - triol - 3,20 - dione - 21 - acetate - 3,20-bis-ethylene ketal; $\Delta^{1,4}$-pregnadiene-11β,17α,21-triol-3,20-dione 21-lower acylate (such as the 21-acetate, propionate, butyrate and t-butyl acetate); $\Delta^{1,4}$-pregnadiene-11β,21-diol-3,20-dione 21-acetate; $\Delta^{1,4}$-pregnadiene-11β,17α-diol-3,20-dione; $\Delta^{4,16}$-pregnadiene-11β,21-diol-3,20-dione 21-acetate and $\Delta^1$-allopregnene-11β,17α,21-triol-3,20-dione 21-acetate.

The $\Delta^{9(11)}$-anhydro-pregnanes and unsaturated pregnanes and the $\Delta^{9(11)}$-anhydro-allopregnanes and unsaturated allopregnanes obtained by our process are useful as intermediates in the synthesis by known methods of physiologically-active 9α-halo-11β-hydroxy steroids of the pregnane series unsaturated in at least the 4:5 position.

The following examples are given for purposes of illustration:

Example 1

A 4.05 gram sample of $\Delta^4$-pregnene-11β,17α,21-triol-3,20-dione 21-acetate is dissolved by heating in 150 ml. of dry tetrahydrofuran and the resulting mixture cooled to −10° C. Dry pyridine (8 ml.) is then added to the cooled mixture followed by 11.5 grams of methyl chlorosulfinate at such a rate to maintain the temperature at −10° C. to −5° C. The reaction mixture is then allowed to warm to room temperature (20–30° C.) over a period of four hours. The $\Delta^{4,9(11)}$-pregnadien-17α,21-diol-3,20-dione 21-acetate is precipitated from the reaction mixture by the addition of 150 ml. of ice water. The product is filtered after aging for one-half hour and washed with cold water. Yield 3.45 grams, melting point 226–230° C.

Example 2

A 4.0 gram sample of $\Delta^4$-pregnene-11β,17α,21-triol-3, 20-dione 21-acetate is dissolved in 20 ml. of dimethylformamide. 11.5 grams of methyl chlorosulfinate is added to the mixture while maintaining the temperature between 20–25° C. by external cooling. The reaction mixture sets to a semisolid mass shortly after the addition of the sulfinate is begun. Thirty minutes after the addition of the methyl chlorosulfinate, 70 cc. of methanol are added. The product, $\Delta^{4,9(11)}$-pregnadien-17α,21-diol-3,20-dione 21-acetate, is aged in an ice bath for 30 minutes, filtered and washed with methanol and then recrystallized from chloroform-methanol.

Example 3

831 mg. of $\Delta^{1,4}$-pregnadiene-11β,17α,21-triol-3,20-dione 21-acetate are dissolved with heating in 1.65–1.70 ml. of pyridine and 31 ml. of tetrahydrofuran. The solvents are dried over potassium hydroxide prior to use. The mixture, protected from the atmosphere with a drierite tube, is chilled to −10° C. and treated, with constant stirring, with 1.80 ml. of methyl chlorosulfinate. The temperature is maintained at about −10° C. during the addition. A crystalline solid which separates at the beginning of the reaction subsequently turns into an oil. The reaction mixture, after standing at room temperature for four hours, is chilled and treated with about 200 ml. of a 5% solution of sodium bicarbonate. The treatment with base converts the oil again into a crystalline solid.

The solid, after aging at room temperature overnight, is removed by filtration and washed copiously with water. The filtrate is extracted with ethyl acetate and the extracts are combined with a solution of the wet crystalline solid in the same solvent. The ethyl acetate solution is washed twice with a saturated salt solution and then evaporated to dryness. The crude product is recrystallized from methanol-water to give purified $\Delta^{1,4,9(11)}$-pregnatrien-17α, 21-diol-3,20-dione 21-acetate. One additional recrystallization by displacement of acetone with petroleum ether affords substantially pure material, melting point 216–220.5° C.,

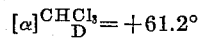

Example 4

A solution of 2.0 grams of pregnane-11β,17α,21-triol-3,20-dione 21-acetate in 3 ml. of dry pyridine and 70 ml. of dry tetrahydrofuran is cooled to about −10° C. 4.0 ml. of methyl chlorosulfinate are added to the cold stirred solution of steroid. The mixture is allowed to warm to room temperature over a period of about five hours. It is then cooled and treated with 400 ml. of 5% aqueous sodium bicarbonate. The solid material which forms upon the bicarbonate treatment is filtered, washed well with cold water and dissolved in ethyl acetate. This organic solution is washed successively with sodium chloride solution, dilute hydrochloric acid and water and finally concentrated to dryness in vacuo. Crystallization of the residue from methanol-water yields $\Delta^{9(11)}$-pregnen-17α,21-diol-3,20-dione 21-acetate.

What is claimed is:

1. The process for preparing a $\Delta^{9(11)}$-3,20-bisoxygenated steroid of the pregnane series that comprises reacting a steriod selected from the group consisting of 11β-hydroxy - 3,20-bisoxygenated-$\Delta^4$-pregnenes and 11β-hydroxy-3,20-bisoxygenated-$\Delta^5$-pregnenes having a hydrogen atom attached to the C–9 position with an alkyl halosulfinate of the formula

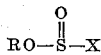

where R is lower alkyl and X is selected from the group consisting of chlorine and bromine.

2. The process of claim 1 wherein the reaction is carried out in the presence of an acid binding agent.

3. The process for preparing a $\Delta^{9(11)}$-3,20-bisoxygenated-17α-hydroxy-21-lower alkanoyloxy steroid of the pregnane series that comprises reacting a steroid selected from the group consisting of 11β,17α-dihydroxy-3,20-bisoxygenated-21-lower alkanoyloxy-$\Delta^4$-pregnenes and 11β,-17α-dihydroxy-3,20-bisoxygenated-21-lower alkanoyloxy-$\Delta^5$-pregnenes having a hydrogen atom attached to the C–9 position with an alkyl halosulfinate of the formula

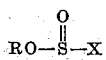

where R is lower alkyl and X is selected from the group consisting of chlorine and bromine.

4. The process of claim 3 wherein the action is carried out in the presence of an acid binding agent.

5. The process for producing $\Delta^{4,9(11)}$-pregnadien-17α,21-diol-3,20-dione-21-lower-alkanoate which comprises reacting $\Delta^4$-pregnene-11β,17α,21-triol-3,20-dione-21-lower-alkanoate with a lower alkyl chlorosulfinate.

6. The process of claim 5 where the 21-lower alkanoate is the acetate and the lower alkyl chlorosulfinate is methyl chlorosulfinate.

7. The process of claim 6 wherein the reaction is carried out in the presence of an acid binding agent.

8. The process for producing $\Delta^{1,4,9(11)}$-pregnatrien-17α,21-diol-3,20-dione-21-lower-alkanoate which comprises reacting $\Delta^{1,4}$-pregnadiene-11β,17α,21-triol-3,20-dione-21-lower-alkanoate with a lower alkyl chlorosulfinate.

9. The process of claim 8 wherein the 21-lower alkanoate is the acetate and the lower alkyl chlorosulfinate is methyl chlorosulfinate.

10. The process of claim 9 wherein the reaction is carried out in the presence of an acid binding agent.

References Cited in the file of this patent

UNITED STATES PATENTS 2,763,771    Fried et al. _____ Sept. 18, 1956